Patented July 10, 1951

2,560,355

UNITED STATES PATENT OFFICE 2,560,355

CONDENSATION PRODUCTS OF SILICON HALIDES WITH CHLORWAX-NAPHTHALENE AND CHLORWAX-PHENOL

Eugene Lieber, Chicago, Ill., and Edward P. Cashman, Bayonne, N. J., assignors to Standard Oil Development Company, a corporation of Delaware No Drawing. Application March 8, 1946, Serial No. 653,179

15 Claims. (Cl. 260—448.2)

This invention relates to novel chemical products and to methods of preparing same, and more particularly it relates to the preparation of chemical condensation products having improved wax-modifying properties, particularly for use as pour depressors for waxy mineral lubricating oils.

It is known that wax modifying agents may be prepared by condensation of relatively long chain paraffinic materials such as chlorinated paraffin wax or olefins corresponding thereto, with aromatic hydrocarbons such as naphthalene, benzene, toluene, anthracene, phenanthrene, mixed coal tar aromatics, etc., as well as hydroxy or amino derivatives of such aromatic hydrocarbons, e. g. phenol, cresols, naphthols, aniline, xylidine, etc.

The condensation of such materials has generally been carried out in the presence of a Friedel-Crafts catalyst such as aluminum chloride, zinc chloride, boron fluoride, etc., preferably in the presence of an inert solvent such as a refined kerosene, tetrachloroethane, dichlorbenzene, etc., and at a temperature ranging from about room temperature to about 300° F., preferably not exceeding about 200° F., and generally using proportions of about 2 to 5 moles of the chlorwax type of constituent to 1 mole of the aromatic constituent. For example, about 10 to 20 parts by weight of naphthalene may be condensed with 100 parts by weight of chlorinated paraffin wax having about 10 to 20% chlorine, preferably about 12 to 15% chlorine, in the presence of about 100 to 300 parts by weight of a refined kerosene solvent, and using about 1 to 3% by weight of aluminum chloride catalyst based on the weight of the chlorinated paraffin wax, starting the reaction at room temperature, and gradually raising the temperature of the reaction mixture to a final temperature of about 90° F. for about 5 hours. Residual catalyst may then be hydrolyzed and removed by washing with water, alcohol, aqueous caustic soda or dilute hydrochloric acid, etc., settling and drawing off the resultant sludge, and finally the desired high molecular weight Friedel-Crafts condensation product is recovered from the reaction mass by distillation under reduced pressure such as under vacuum of about 1 to 50 mm. mercury absolute pressure, or by steam distillation, to a temperature of about 600° F.

The distillation residue thus obtained is a wax-modifying agent which is oil-soluble, has an average molecular weight of above about 1,000, preferably about 1,500 to 5,000, and generally has very good pour depressing properties as determined by the standard ASTM pour point test. For instance, when added in amounts ranging from 0.1 to 2.0% to a waxy mineral lubricating oil having a pour point of +30° F., the resulting blend will generally have pour points ranging from −10° F. or −20° F. down to below −35° F. which is generally the lowest temperature tested.

However, under field conditions of winter storage, where the oil blends are subjected to frequent fluctuations of high and low temperatures, these blends have sometimes been found to be solid at temperatures substantially above the ASTM pour point, and these blends did not show as good pour stability, as measured by the Test V procedure (described in the Oil and Gas Journal, June 24, 1943), as might be desired. It is one of the primary objects of the present invention to modify those Friedel-Crafts condensation products in such way as to produce pour depressors having improved pour stability.

Broadly, the present invention comprises modifying such wax modifiers and pour depressors, which may be referred to as high molecular weight Friedel-Crafts condensation products of a long chain aliphatic compound and an aromatic compound, by reacting them with a silicon halide having the general formula $Si_nX_m$, where $n$ and $m$ are integers indicating the number of silicon and X atoms respectively, and $X_m$ are atoms selected from the group consisting of halogens, hydrogen and oxygen, providing that at least 1 X atom is a halogen, there being preferably 2 halogen atoms. Generally, $n$ will be 1 or 2, and $m$ will range from about 1 to 10, preferably 2 to 6.

Examples of suitable silicon halogen compounds which may be used, include $SiCl_4$, $SiBr_4$, $Si_2Cl_6$, $SiHCl_3$, etc. Thus the compound used may be selected from the class consisting of true silicon halides and their hydrides and oxides, providing that they contain at least one chlorine or other halogen atom.

The secondary reaction, i. e. the condensation of the initial aliphatic-aromatic wax modifier with the silicon halide, is brought about under substantially the same conditions as used in the initial condensation, i. e. with the same type of Friedel-Crafts catalyst, and at substantially the same or slightly lower temperature range, and preferably in the presence of an inert solvent. It is found that this reaction proceeds with greater ease than the prior reaction.

Although the amount of the silicion halogen compound to be used in reacting with the aliphatic - aromatic initial condensation product may vary, for instance according to the number of halogen atoms in it, or according to its molecular weight in relation to the molecular weight of the initial condensation product, generally the amount of the silicon halogen compound to be used should be about 1 to 50% by weight, preferably about 5 to 25% by weight, based on the total weight of initial wax modifier. These amounts will give a final product containing an amount of silicon corresponding to an average of one atom of silicon per 1 to 4 molecules of the initial wax modifier.

In carrying out the invention, several alternative procedures may be used. For instance, the initial Friedel-Crafts condensation reaction may be completed and the desired initial high molecular weight condensation product separated by hydrolysis and removal of residual catalyst, and recovered by distillation under reduced pressure, and then subsequently redissolved in a suitable inert solvent such as tetrachloroethane or others mentioned previously, and subjected to the secondary condensation by adding the desired amount of reactive silicon halogen compound, e. g. silicon tetrachloride, and a Friedel-Crafts catalyst such as a small amount of aluminium chloride.

It has been found advantageous, however, to add the silicon halide directly to the total reaction product of the first condensation prior to the hydrolysis step, and to continue the reaction under the same conditions, adding additional catalyst if necessary. In this manner it is possible to have only one set of finishing steps, including catalyst hydrolysis and removal, and distillation.

The resulting second or final condensation product is found to have not only good pour depressing properties as measured by the ASTM pour point test, but also improved pour stability as measured by the Test V procedure referred to above.

The final condensation product of this invention has a molecular weight somewhat higher than that of the initial condensation product, due to the subsequent chemical condensation, but it is still soluble in hydrocarbon oils such as waxy mineral lubricating oil and may be used in concentrations ranging from as little as .01% to 5.0%, preferably about 0.05% to 1.0% in such waxy or highly paraffinic lubricating oil base stocks. It may also be used in lubricating grease compositions comprising essentially a waxy oil thickened with a suitable grease-forming soap such as calcium stearate, aluminum stearate, or sodium, lithium or other metal stearates, oleates, naphthenates, etc. These silicon derivatives of aliphatic-aromatic pour depressing condensation products may also be used to improve the physical properties of paraffin wax itself, especially for use in coating paper, etc., and may also be used as a dewaxing aid in the dewaxing of lubricating oil base stocks.

The wax modifiers of this invention, when subjected to combustion analysis, show a slight per cent of ash generally ranging from about 0.2% to 5.0%, preferably about 0.5% to 2.0%, this ash being essentially silica ($SiO_2$) due to combustion oxidation of the silicon (Si) chemically combined into the aliphatic-aromatic initial wax modifier. The actual per cent of silicon in the product is slightly less than half the per cent ash.

The invention will be better understood from a consideration of the following experimental data.

*Example I*

An initial wax modifier is produced by condensing 100 parts by weight of chlorparaffin (14% chlorine) with 15 parts by weight of naphthalene using 2½ parts by weight of $AlCl_3$ as the catalyst. The reaction was conducted at a temperature of about 88° F. in the presence of about 30–40 parts (based on chlorparaffin) of kerosene as solvent. After a reaction time of 4½ hours the catalyst is hydrolyzed by the addition of an excess of isopropyl alcohol and aqueous caustic and the aluminum hydroxide produced by hydrolysis was removed. The product was then distilled to remove the diluent and the unreacted constituents to a temperature of 600° F. with fire and steam. The material recovered as the distillation residue is a wax modifying agent and is referred to here and after as the "initial condensation product."

150 grams of this initial condensation product was dissolved in 150 cc. of o-dichlor-benzene as solvent. To this was added 15 grams of $AlCl_3$ and the temperature adjusted to 90° F. 30 grams of silicon tetrachloride was then added to the reaction mixture with agitation over a period of 30 minutes. After the addition of the silicon tetrachloride the reaction temperature is maintained at 90° F. for a period of 2½ hours, after which it was diluted with a liter of solvent and the $AlCl_3$ destroyed by neutralization with a mixture of alcohol and water. After settling and discarding the aqueous layer, the extract was distilled with fire and steam to 600° F. in order to remove the solvent and low boiling products. A bottoms yield of a very viscous greenish oil weighing 194 grams was obtained as product. Analysis showed 0.31% ash content.

The product obtained as described above was tested for ordinary pour depressant potency by the standard ASTM procedure in two different types of waxy lubricating oil base stocks. The following results were obtained:

| Test No. | Per Cent Product Added to | Oil A | Oil B |
|---|---|---|---|
| 1 | None | +30 | +30 |
| 2 | 0.05 | +15 | +15 |
| 3 | 0.10 | −5 | −5 |
| 4 | 0.125 | −10 | −10 |

*Example II*

Instead of separating the initial condensation product from the catalyst and solvent used in its preparation, before subjecting it to the secondary reaction, a combination process was carried out by suspending 35 grams of naphthalene and 10 grams of $AlCl_3$ in 37½ cc. of orthodichlorbenzene as solvent and adding 259 grams of chloro-wax (containing 14.3% chlorine) slowly (over a period of 30 minutes) at a reaction temperature of 105–110° F. After the addition of the chloro-wax, an additional 100 cc. of solvent was added and the reaction temperature increased to 125° for 2½ hours. At this point of the reaction 28 grams of silicon tetrachloride was added dropwise over a period of 30 minutes. After an additional 30 minutes reaction at 125° F., the reaction mixture was diluted with about 1,000 cc. of solvent and the $AlCl_3$ destroyed by an aqueous solution of isopropyl alcohol (to prevent emulsions). After drawing off and discarding the aluminum hydroxide sludge the product layer was subjected to a fire and steam distillation removing all volatile products up to 600° F. The bottoms of the distillation comprises the product. A yield of 192 grams of a viscous green oil was obtained.

Analysis showed the product to contain 1.93% ash. It is believed that this amount of ash indicates that the final condensation product contained about 1 atom of silicon per 2 molecules of initial wax-naphthalene condensation product.

The product obtained as described above was tested for ordinary pour depressant potency by the standard ASTM procedure in two different types of waxy lubricants. The following results were obtained:

| Test No. | Per Cent Product Added to | Oil A | Oil B |
| --- | --- | --- | --- |
| 5 | None | +30 | +30 |
| 6 | 0.05 | −5 | −10 |
| 7 | 0.10 | −10 | −20 |
| 8 | 0.125 | −15 | −20 |

The above data, as well as the data in Example I, indicate that the condensation products of this invention are very effective pour depressors when tested by the standard ASTM pour point procedure, as they are at least as effective as the initial wax modifiers used.

These new condensation products are, however, unexpectedly far superior to the initial wax modifiers in regard to pour point stability. For example, when the initial and final condensation products of Example II were tested in a concentration of 0.155% in a waxy lube oil base stock for pour stability by the Test V procedure previously referred to, the following data were obtained:

| | Stable Pour Point (°F.) |
| --- | --- |
| Oil + initial condensation product | +20 |
| Oil + final condensation product | −12 |

These data show that even a very small concentration, i. e. 0.155%, of the silicon derivative of the initial wax modifier was sufficient to lower the stable pour point 32° F. lower than the stable pour point obtained with the initial wax modifier.

It is not intended that this invention be limited to the specific materials which have been mentioned merely for the sake of illustration but only by the appended claims in which it is intended to claim all novelty inherent in the invention as well as all modifications coming within the scope and spirit of the invention.

We claim:

1. Process which comprises modifying a condensation product having a molecular weight in the range of 1000 to 5000 of a saturated long chain aliphatic halogenated hydrocarbon compound and an aromatic compound selected from the group consisting of aromatic hydrocarbons and mono hydroxy and mono amino derivatives thereof, by reacting said condensation product in the presence of a Friedel-Crafts catalyst with a silicon halogen compound selected from the class consisting of $SiCl_4$, $Si_2Cl_6$, $SiBr_4$ and $Si_2BR_6$.

2. Process which comprises modifying a pour depressor having a molecular weight in the range of 1000 to 5000 and derived by Friedel-Crafts condensation of chlorinated paraffin wax with naphthalene, by reacting said pour depressor in the presence of a Friedel-Crafts catalyst with a silicon halide selected from the class consisting of $SiCl_4$, $Si_2Cl_6$, $SiBr_4$ and $Si_2BR_6$.

3. Process which comprises modifying a chlorwax-naphthalene condensation product having a molecular weight in the range of 1000 to 5000 and having pour depressing properties, by reacting said condensation product with an inorganic silicon halide, in the presence of a Friedel-Crafts catalyst, hydrolyzing and removing residual catalyst and subjecting the reaction product to distillation under reduced pressure up to a temperature of about 600° F. to obtain the desired final condensation product as distillation residue.

4. Process according to claim 3 in which the silicon halide is silicon tetrachloride.

5. Process according to claim 3 in which the amount of silicon halide used is about 1 to 50 parts by weight per hundred parts by weight of initial chlorwax-naphthalene condensation product.

6. Process according to claim 3 carried out in the presence of an inert solvent.

7. Process according to claim 3 carried out in the presence of ortho-dichlorbenzene as solvent.

8. Process which comprises condensing about 100 parts by weight of chlorinated paraffin wax containing about 10 to 20% by weight of chlorine, with about 10 to 20 parts by weight of naphthalene, in the presence of about 1 to 3 parts by weight of aluminum chloride catalyst and in the presence of an inert solvent, at a temperature between the approximate limits of room temperature and about 150° F., using a final reaction temperature of about 125° F. for about 1 to 10 hours, to make an initial wax-naphthalene condensation product having a molecular weight of at least 1000, then without removal of catalyst or solvent adding about 1 to 50 parts by weight of a reactive silicon halogen compound selected from the class consisting of $SiCl_4$, $Si_2Cl_6$, $SiBr_4$ and $Si_2BR_6$, using additional aluminum chloride catalyst to insure complete reaction, and after the resulting condensation has been completed, hydrolyzing and removing residual catalyst and subjecting the final condensation product to fire and steam distillation up to about 600° F. to remove solvent and low boiling products, and to obtain the desired final condensation product as distillation residue.

9. Process according to claim 8 using about 1 to 50 parts by weight of silicon tetrachloride.

10. A Friedel-Crafts condensation product of a silicon halogen compound selected from the class consisting of $SiCl_4$, $Si_2Cl_6$, $SiBr_4$ and $SiBR_6$ with a condensation product having a molecular weight in the range of 1000 to 5000 of a long chain aliphatic compound and an aromatic compound selected from the class consisting of monomeric aromatic hydrocarbons and hydroxy and amino derivatives thereof wherein the reaction temperature is maintained within the range of room temperature to 300° F. and the silicon halogen reactant ranges from 1 to 50% by weight based on the initial wax modifier, said final condensation product being soluble in waxy mineral lubricating oils and being substantially non-volatile up to about 600° F. under reduced pressure.

11. Product according to claim 10 being a silicon derivative of a chlorwax-naphthalene condensation product.

12. Product according to claim 10 being a Friedel-Crafts condensation product of silicon tetrachloride with a Friedel-Crafts condensation product having a molecular weight in the range of 1000 to 5000 of a chlorinated paraffin wax having about 10 to 20% chlorine content with about 10 to 20 parts by weight of naphthalene wherein the reaction temperature is maintained within the range of room temperature to 300° F. and the silicon halogen reactant ranges from 1 to 50% by weight based on the initial wax modifier, said final condensation product containing an amount of silicon corresponding to an average of 1 atom of silicon per 1 to 4 molecules of wax-naphthalene condensation product.

13. Product comprising essentially a silicon derivative of an aliphatic-aromatic condensation product having a molecular weight of at least 1000, said product being obtained by condensing about 100 parts by weight of a chlorinated paraffin wax with about 10 to 30 parts by weight of phenol and reacting said condensation product in the presence of about 1 to 3 parts by weight of a Friedel-Crafts catalyst and at a temperature within the range of room temperature to 150° F. with about 1 to 50 parts by weight of a reactive silicon halogen compound selected from the class consisting of $SiCl_4$, $Si_2Cl_6$, $SiBr_4$ and $Si_2Br_6$, adding additional Friedel-Crafts catalyst to insure complete reaction and subjecting the final condensation product to distillation up to about 600° F. to obtain the desired final condensation product as a distillation residue.

14. Product comprising essentially a silicon derivative of an aliphatic-aromatic condensation product having a molecular weight of at least 1000, said product being obtained by condensing about 100 parts by weight of a chlorinated paraffin wax with about 10 to 30 parts by weight of naphthalene and reacting said condensation product in the presence of about 1 to 3 parts by weight of a Friedel-Crafts catalyst and at a temperature within the range of room temperature to 150° F. with about 1 to 50 parts by weight of a reactive silicon halogen compound selected from the class consisting of $SiCl_4$, $Si_2Cl_6$, $SiBr_4$ and $Si_2Br_6$, adding additional Friedel-Crafts catalyst to insure complete reaction and subjecting the final condensation product to distillation up to about 600° F. to obtain the desired final condensation product as a distillation residue.

15. Process which comprises modifying a pour depresser having a molecular weight in the range of 1000 to 5000 and derived by Friedel-Crafts condensation of chlorinated paraffin wax with phenol by reacting said pour depresser in the presence of a Friedel-Crafts catalyst with a silicon halide compound selected from the class consisting of $SiCl_4$, $Si_2Cl_6$, $SiBr_4$ and $Si_2Br_6$.

EUGENE LIEBER.
EDWARD P. CASHMAN.

REFERENCES CITED

The following references are of record in the file of this patent:

UNITED STATES PATENTS

| Number | Name | Date |
|---|---|---|
| 2,030,307 | MacLauren | Feb. 11, 1936 |
| 2,182,208 | Nason | Dec. 5, 1939 |
| 2,191,499 | Reiff | Feb. 27, 1940 |
| 2,224,359 | Rosenblum | Dec. 10, 1940 |
| 2,357,287 | Reiff | Sept. 5, 1944 |
| 2,368,880 | Reiff | Feb. 6, 1945 |
| 2,377,267 | Reiff | May 29, 1945 |
| 2,379,821 | Miller | July 3, 1945 |
| 2,405,019 | Dalin | July 30, 1946 |
| 2,406,671 | Diamond | Aug. 27, 1946 |

OTHER REFERENCES

Shtetter, Russian certificate of invention, 44,934, U. S. S. R., "Journal of Board of Inventions," (1935) page 94. (Photostat in 260/448.2, Discussed in Rochow "Chemistry of Silicones" 1946, pages 25 and 26.)

Post, "Silicones and Other Organic Silicon Compounds," 1949, pages 145 and 146. Reinhold, Publisher.

Research Association of Brit. Rubber Mfgr's, vol. 24, No. 7 (1947).